3,060,196
UNSATURATED ALIPHATIC AMINO-DIOLS AND
PROCESS FOR THEIR MANUFACTURE
Cyril Grob, Basel, Switzerland, assignor to Ciba
Corporation, a corporation of Delaware
No Drawing. Filed May 31, 1957, Ser. No. 662,582
Claims priority, application Switzerland June 6, 1956
30 Claims. (Cl. 260—340.7)

This invention relates to a new stereo-specific process for the manufacture of 1:3-dihydroxy-2-amino-alk-4-enes of the formula

R—CH=CH—CHOH—CHNH$_2$—CH$_2$OH in which R indicates an alkyl radical, especially a higher alkyl radical, and their acyl compounds in the form of their different isomers such as the threo- and erythro-compounds, their cis- and trans-forms and their optical antipodes. The invention concerns especially the stereo-specific manufacture of compounds of the sphingo-sin-series. It is known that sphingosin has the constitution of trans-erythro-1:3-dihydroxy-2-amino-octadec-4-ene of the formula

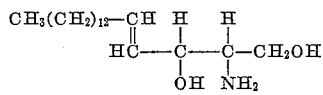

and has a strong spasmolytic effect. By reduction of this compound, erythro-dihydrosphingosin is obtained and by condensation of palmitic aldehyde with β-nitroethanol and subsequent reduction of the nitro group threo-dihydrosphingosin is produced. It has not been possible hitherto, however, to synthesize the threo-sphingosines.

The present invention provides a simple method of producing stereo-specifically 1:3-dihydroxy-2-amino-alk-4-enes by condensing alk-2-ynals-(1) with β-nitroethanol, reacting the resulting 1:3-dihydroxy-2-nitro-alk-4-yns with an aldehyde, in the resulting nitro-m-dioxanes, if desired after isomerization, reducing the nitro group, if desired acylating the amino-group thereby formed, splitting up the dioxane ring and at any stage after the reduction of the nitro group converting the triple bond into a double bond.

The condensation of the alk-2-ynals-(1) with β-nitroethanol can be carried out by methods known per se. The result is somewhat surprising, since in this reaction it is not the expected 1:4-addition, but a 1:2-addition to the carbonyl group which takes place. The reaction of the resulting 1:3-dihydroxy-2-nitro-alk-4-yns with an aldehyde, especially an aromatic aldehyde, primarily benzaldehyde, is preferably carried out in the presence of an acid condensing agent, such as zinc chloride, as a result of which 4-alk-1'-ynyl-5-nitro-m-dioxanes are obtained. These can be easily isomerized, for example by heating to elevated temperature or by treatment with alkaline agents. In this conversion the nitro group showing threo-configuration is preferably converted into the erythro-configuration. In the resulting nitro-m-dioxanes the nitro group is then reduced, preferably with aluminum amalgam. The amino-group thus formed can then be acylated in the manner known per se, which greatly facilitates the splitting of the dioxane ring, which can be carried out with acid agents such as dilute hydrochloric acid. At any stage after the reduction of the nitro group, i.e. before or after the splitting up of the dioxane ring, the triple bond can be converted into a double bond. For this purpose there is preferably used hydrogen in the presence of a Lindlar-catalyst or a palladium-catalyst poisoned with quinoline, cis-compounds being thus obtained. For the production of the trans-isomers reduction is carried out preferably with an alkali metal, especially sodium or potassium, in the presence of an alcohol or with a dimetal hydride such as lithium-aluminum hydride. The resulting amino-diols can, if desired, be converted in the manner known per se into acyl derivatives, or resulting acyl derivatives into the free amino-diols. Resulting racemates can be resolved into their optical antipodes, for example by treatment with optically active glutamic acid or by the microbiological method.

Depending on the reaction conditions, the amino-diols are obtained as free bases or in the form of salts thereof, preferably as salts with acids, such as hydrohalic acids, for example, hydrochloric acid, nitric acid, sulfuric acid, phosphoric acids, perchloric acid, acetic aid, citric acid, oxalic acid, tartaric acid, ascorbic acid, methane sulfonic acid, hydroxyethane sulfonic acid, paratoluene-sulfonic acid or salicylic acid, para-aminosalicylic acid or acetylsalicylic acid. The bases can be converted into their salts in known manner and resulting salts into their bases.

The starting material is known or can be prepared by methods kown per se.

The new compounds can be used as medicaments or as intermediate products for the production thereof.

The new threo-compounds are active against fungi, for example soor. Especially valuable is the DL-cis-threo-1,3-dihydroxy-2-amino-octadec-4-ene which has a strong effect against thrush.

The following examples illustrate the invention:

*Example 1*

In a 50 cc. conical flask 86 mg. of potassium carbonate in 2 cc. of methanol are cooled to 0° C. and then simultaneously 1 gram of hexadeo-2-ynal-(1) and 0.38 gram of nitroethanol are added. This mixture is maintained for 15 minutes at 0° C. and then allowed to stand for 1 hour at room temperature. It is then cooled again to 0° C., rendered slightly acid with glacial acetic acid and a few drops of water and extracted with ether. The ether extracts are washed until neutral with water, dried over sodium sulfate and evaporated under vacuum. On the addition of pentane, the threo-1:3-dihydroxy-2-nitro-octadeo-4-yn of the formula

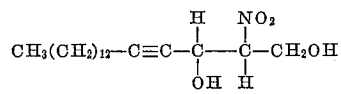

is precipitated and after recrystallization three times from ether-pentane, melts at 74–75° C.

103 mg. of pure threo-1:3-dihydroxy-2-nitro-octadec-4-yn are shaken for eight days at 18° C. in 5 cc. of absolute benzene with 0.5 cc. of freshly distilled benzaldehyde and freshly fused and pulverised zinc chloride (two portions on the end of a spatula). The product is filtered, the zinc chloride washed twice with fresh benzene, the filtrate freed from benzene under vacuum and excess of benzaldehyde removed under high vacuum. The residue is distributed between ether and water and the ether solution washed with 2 N-sodium carbonate solution and then with water, dried over sodium sulfate and evaporated under vacuum. After the addition of pentane, fine needles of 2-phenyl-4-pentadeo-1'-ynyl-5-nitro-m-dioxane of the formula

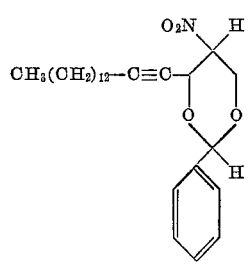

and of M.P. 69–72° C. are precipitated. After recrystallization twice from ethanol, this compound melts at 74–75° C.

The mother liquors are evaporated to dryness and ethanol added. By standing in an ice box followed by filtration, lustrous leaflets are obtained of the compound isomeric in position 2 of the dioxane ring of the formula

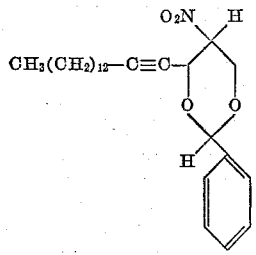

of M.P. 33–35° C. After recrystallization twice from ethanol, this compound melts at 34–35° C.

2.7 grams of the m-dioxane compound melting at 34–35° C. are dissolved in 90 cc. of ether, 6 cc. of water added and the whole allowed to stand for 14 hours at room temperature with aluminum amalgam prepared from 3 grams of aluminum. The aluminum sludge formed is filtered off and extracted three times with boiling ether and the combined ether extracts are evaporated somewhat under vacuum and dried over sodium sulfate. After removal of the ether, a colorless oil is obtained of the formula

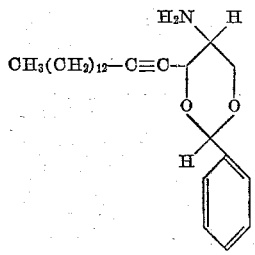

260 mg. of this compound are dissolved in 3 cc. of absolute pyridine, treated with 2 cc. of acetic anhydride and the whole allowed to stand for 15 hours at 18° C. with exclusion of moisture. The product is then evaporated under vacuum at 40° C., taken up in ether and the ethereal solution washed with 2 N-hydrochloric acid, with 2 N-sodium carbonate solution and with water, dried over sodium sulfate and evaporated. On concentration, colorless, fine needles crystallize of 2-phenyl-4-pentadeo-1'-ynyl-5-acetamino-m-dioxane of the formula

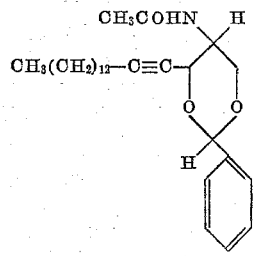

of M.P. 115–116° C. This compound can be recrystallized from acetone. The isomeric compound of the formula

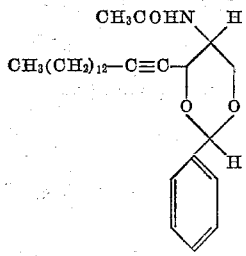

is obtained in an analogous manner from the 2-phenyl-4-pentadec-1'-ynyl-5-nitro-m-dioxane which melts at 74–75° C., in colorless plates of M.P. 111–112° C.

103 mg. of the acetylamino-m-dioxane of M.P. 115–116° C. are dissolved in 4 cc. of dioxane and treated with 4 cc. of 2 N-hydrochloric acid. The reaction mixture is maintained for ½ hour at 70° C., rendered alkaline with a few drops of a potassium carbonate solution and distributed between chloroform and water. The chloroform solution is washed with water, dried over sodium sulfate and evaporated. The crystalline residue is dissolved in a little ether and the ether solution cooled, as a result of which colorless threo-1:3-dihydroxy-2-acetamino-octadec-4-yn of the formula

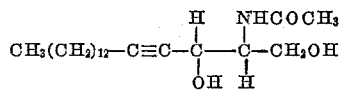

and M.P. 104–105° C. is obtained. This N-acetyl-aminodiol can be recrystallized from acetone.

Analogous hydrolysis of the acetamino-m-dioxane of M.P. 111–112° C. likewise gives this compound. The mixed melting point gives no depression.

116 mg. of this compound are dissolved in 6 cc. of n-butanol and the solution heated on an oil bath at 120° C. To this solution are added within 15 minutes 200 mg. of sodium and, when all the sodium has dissolved, the majority of the butanol is removed under vacuum. The residue is distributed between ether and water, the ethereal fraction being washed wtih 2 N-hydrochloric acid and then with water, dried over sodium sulfate and evaporated under vacuum. The residue, a brown oil, is treated with a little ether and cooled. There is thus obtained the wax-like, colorless trans-threo-DL-sphingosin of the formula

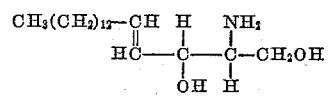

73 mg. of this substance are dissolved in 1 cc. of absolute pyridine, treated with 1 cc. of acetic anhydride and the whole left to stand for 2 days at 18° C. It is then evaporated under vacuum at 40° C. to dryness and the residue extracted with ether and the ethereal solution washed with 2 N-hydrochloric acid, 2 N-sodium carbonate solution and water, dried over sodium sulfate and evaporated. From pentane a crude product crystallizes of M.P. 65–75° C. Further recrystallization from pentane gives lens-shaped crystals of M.P. 69–71° C. of the triacetyl derivative.

If the reduction of the acetylene compound is carried out instead of with sodium/butanol with hydrogen in the presence of Lindlar catalyst in absolute alcohol, the corresponding N-acetyl-cis-threo-DL-sphingosin of the formula

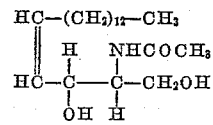

is obtained, which, when recrystallized from acetone, melts at 97–99° C. Its triacetate melts at 40–41° C.

107 mg. of threo-1:3-dihydroxy-2-acetamino-octadec-4-yn are boiled under reflux for 1 hour with a sodium alcoholate solution prepared from 30 mg. of sodium in 3 cc. of absolute ethanol. After concentration under vacuum, distribution is carried out between water and chloroform and the chloroform solution is washed with water, dried over sodium sulfate and evaporated. The colorless residue is taken up in a little ether and threo-1:3-dihydroxy-2-amino-octadec-4-yn is obtained, which when recrystallized from benzene-pentane, forms fine crystals of M.P. 78–79° C.

90 mg. of this compound are heated for 6 hours with stirring with 100 mg. of lithium-aluminum hydride in 10 cc. of absolute ether, whereby a lithium-aluminum complex is precipitated. This is decomposed with a little water and the reaction mixture stirred with 5 cc. of a 20% sodium hydroxide solution. The whole is filtered, the ether layer separated and this washed with water, dried and evaporated. The remaining wax-like threo-trans-DL-sphingosin is acetylated with acetic anhydride and pyridine and yields pure triacetyl derivative of M.P. 68–70° C. The reduction described can be carried out with advantage also in tetrahydrofurane instead of ether.

*Example 2*

31 mg. of sodium are dissolved in 18 cc. of absolute alcohol and 580 mg. of the compound of M.P. 74–75° C., obtained according to Example 1 from 1:3-dihydroxy-2-nitro-octadec-4-yn with benzaldehyde are added. The solution becomes colored instantaneously. After 15 minutes, the brown solution is acidified with glacial acetic acid and evaporated under vacuum to dryness. The residue is distributed between ether and water and the ether fraction washed with water until neutral, dried over sodium sulfate and evaporated under vacuum to dryness. By addition of pentane and recrystallization from pentane there is obtained the 2-phenyl-4-pentadec-1'-ynyl-5-nitro-m-dioxane isomeric in position 5 of the formula

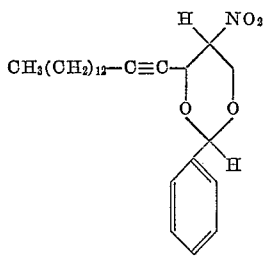

of M.P. 58–60° C.

By starting from the corresponding compound of M.P. 34–35° C., there is obtained in an analogous manner a product of the formula

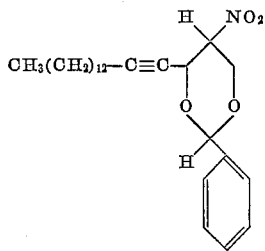

which after recrystallization twice from alcohol melts at 35–36° C.

By reduction of the nitro group and acetylation of the amino group in a manner analogous to that described in Example 1, the 2-phenyl-4-pentadec-1'-ynyl-5-acetamino-m-dioxane of the formula

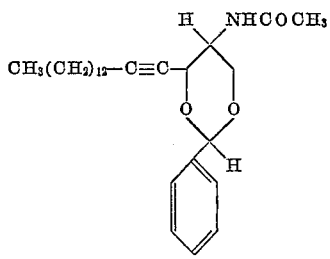

is obtained, which after recrystallization from acetone melts at 115–117° C.

From the isomeric compound there is obtained in a corresponding manner a substance of the formula

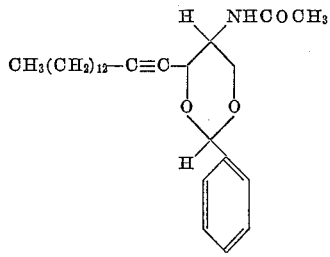

which after recrystallization from acetone melts at 85–86° C.

800 mg. of the acetamino-m-dioxane of M.P. 85–86° C. are dissolved in 40 cc. of dioxane/2 N-hydrochloric acid (1:1) and the reaction mixture maintained for ½ hour at 70° C. It is then rendered alkaline with a few drops of potassium carbonate solution, concentrated under vacuum and extracted with chloroform. The chloroform extracts are well washed with water and dried over sodium sulfate, evaporated and the remaining oil dissolved in a little ether. After dilution with pentane and standing for 1 day in an ice box, a fine difficultly filterable erythro-1:3-dihydroxy-2-acetamino-octadec-4-yn is obtained, which after recrystallization four times from acetone melts at 61–62° C. It has the formula

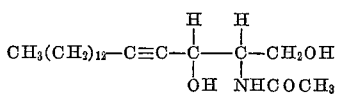

Corresponding hydrolysis of the acetamino-m-dioxane of M.P. 115–117° C. likewise gives this compound.

200 mg. of the resulting erythro-1:3-dihydroxy-2-acetamino-octadec-4-yn are dissolved in 7 cc. of n-butanol, brought to boiling temperature and 200 mg. of sodium added within 17 minutes. The reaction solution is neutralized with a saturated ammonium chloride solution, extracted with chloroform and the chloroform solution washed with water, dried over sodium sulfate and evaporated under vacuum. From ether-pentane there is obtained erythro-trans-DL-1:3-dihydroxy-2-amino-octadec-4-ene which has the configuration of the natural erythro-trans-sphingosin.

70 mg. of the resulting substance are dissolved in 1 cc. of absolute pyridine, treated with 1 cc. of acetic anhydride and the solution allowed to stand for 16 hours at 18° C. Evaporation under vacuum to dryness is carried out at 40° C. followed by taking up of the residue in ether and washing of the ethereal solution with 2 N-hydrochloric acid, then with 2 N-sodium carbonate solution and with water, drying over sodium sulfate and evaporating. On concentration, the triacetyl derivative precipitates, which after recrystallization from ether-pentane melts at 91–92° C.

Reduction of erythro-1:3-dihydroxy-2-acetamino-octadec-4-yn with hydrogen in the presence of a Lindlar catalyst in absolute alcohol, by the absorption of 1 mol of hydrogen gives erythro-cis-DL-1:3-dihydroxy-2-acetamino-octadec-4-one of the formula

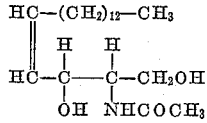

which after recrystallization from ether-pentane, crystallises in rhombs of M.P. 70–71° C. Its triacetyl derivative melts at 83–84° C.

*Example 3*

100 mg. of crude threo-cis-1:3-dihydroxy-2-acetaminooctadec-4-ene of melting point 96–98° C. are boiled under reflux for 2 hours with 5 cc. of a 5% solution of ethanolic sodium hydroxide. The residue obtained by evaporation in vacuo is distributed between chloroform and water, the chloroform solution washed, dried and evaporated. Crystallization from acetonitrile yields pure cis-threo-DL-sphingosin of the formula

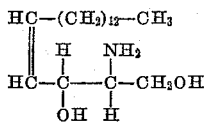

melting at 42–44° C. in the form of needles in clusters.

The analogous hydrolysis of erythro-cis-1:3-dihydroxy-2-acetamino-octadec-4-ene melting at 70–71° C. leads to cis-erythro-DL-sphingosin which, after crystallization from a mixture of benzene and pentane melts at 72–73° C.

*Example 4*

The triacetates mentioned in columns 4 and 5 melting at 40–41° C. and 83–84° C. respectively can be obtained as follows:

55 mg. of N-acetyl-cis-threo-DL-sphingosin melting at 97–99° C. are dissolved in 2 cc. of pyridine, mixed with 1.5 cc. of acetic anhydride and allowed to stand for 18 hours at 20° C. The mixture is evaporated to dryness in vacuo at 40° C., taken up in either, the solution washed with 2 N-hydrochloric acid, 2 N-caustic soda solution and water, dried over sodium sulfate and evaporated. After cooling well, 42 mg. of the triacetate precipitate from pentane in the form of rectangular lamellae which can be recrystallized from pentane. Melting point: 40–41° C.

30 mg. of erythro-cis-DL-1:3-dihydroxy-2-acetamino-octadec-4-ene of melting point 70–71° C. are dissolved in 2 cc. of pyridine, mixed with 1 cc. of acetic anhydride and allowed to stand for 5 hours at room temperature. The mixture is evaporated in vacuo at 40° C., taken up in ether, washed with 2 N-hydrochloric acid, 2 N-caustic soda solution and water, dried over sodium sulfate and evaporated. 35 mg. of the triacetyl compound crystallize from a mixture of ether and pentane in stick shapes which can be recrystallized from a mixture of ether and pentane. Melting point=83–84° C.

*Example 5*

500 mg. of the 2-phenyl-4-pentadec-1′-ynyl-5-acetamino-m-dioxane of melting point 115–116° C. described in Example 1 are dissolved in 90 cc. of dioxane and mixed with 19 cc. of 4 N-hydrochloric acid. The reaction mixture is heated for half an hour on a steam bath, then evaporated somewhat in vacuo, and ether is then added. The mixture is extracted with water, the aqueous hydrochloric acid extract is rendered alkaline with potash and the precipitated amino-diol extracted with ether. The ether extracts are washed with water, dried over sodium sulfate and evaporated. There is obtained threo-1:3-dihydroxy-2-amino-octadec-4-yn which, when recrystallized from a mixture of benzene and pentane, yields fine crystals melting at 83–84° C.

*Example 6*

420 mg. of the 2-phenyl-4-pentadec-1′-ynyl-5-acetamino-m-dioxane of melting point 85–86° C. described in Example 2 are dissolved in 32 cc. of a mixture of dioxane and 4 N-hydrochloric acid (1:1) and heated for half an hour on a steam bath. The solution is evaporated in vacuo until crystallization begins and is then diluted with 20 cc. of ether. The hydrochloride of the amino-diol which precipitates in the form of fine needles is filtered off and washed well with ether to completely remove the benzaldehyde. The precipitate is suspended in chloroform and agitated with 2 N-sodium carbonate solution, the chloroform extracts are washed with water and dried over sodium sulfate. The chloroform is removed in vacuo, the residue is dissolved in a little ether and pentane is added. There are obtained crystals of erythro-1:3-dihydroxy-2-amino-octadec-4-yn which can be recrystallized from a mixture of ether and pentane and melt at 76–77° C.

What is claimed is:

1. A member selected from the group consisting of the cis-isomer and the trans-isomer of the threo-compound of the formula:

R—CH₂—CH=CH—CH(OH)CH(NH₂)CH₂OH in substantially pure form, wherein R represents dodecyl, its N-acetyl derivative and its N,O,O-triacetyl derivative.

2. The threo-compound of the formula:

R—CH₂—C≡C—CH(OH)CH(NO₂)CH₂OH in substantially pure form, wherein R represents dodecyl.

3. The erythro-compound of the formula:

R—CH₂—C≡C—CH(OH)CH(NO₂)CH₂OH in substantially pure form, wherein R represents dodecyl.

4. Threo-1,3-dihydroxy-2-nitro-octadec-4-yne in substantially pure form.

5. Erythro-1,3-dihydroxy-2,nitro-octadec-4-yne in substantially pure form.

6. The threo-compound of the formula:

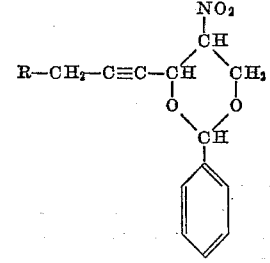

wherein R represents dodecyl.

7. The erythro-compound of the formula:

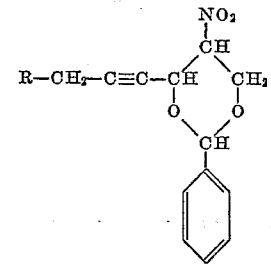

wherein R represents dodecyl.

8. A member selected from the group consisting of the threo-compound of the formula:

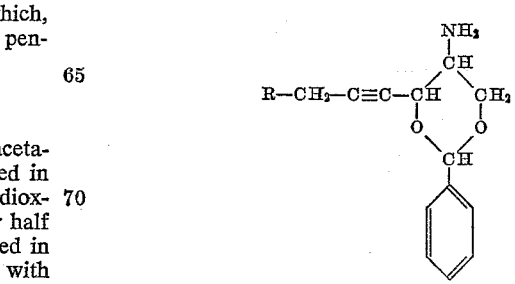

wherein R represents dodecyl, and its N-acetyl-compound.

9. A member selected from the group consisting of the erythro-compound of the formula:

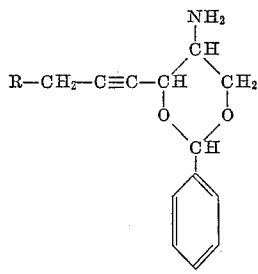

wherein R represents dodecyl, and its N-acetyl compound.

10. Threo-compound of the formula:

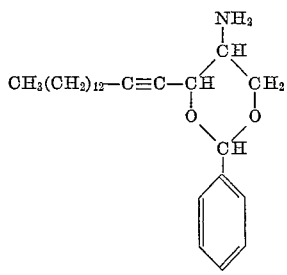

11. The N-acetyl derivative of the compound claimed in claim 10.

12. Erythro-compound of the formula:

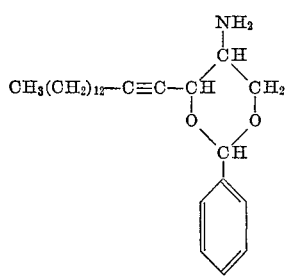

13. The N-acetyl derivative of the compound claimed in claim 12.

14. A member selected from the group consisting of the threo-compound of the formula:

R—CH$_2$—C≡C—CH(OH)CH(NH$_2$)CH$_2$OH in substantially pure form wherein R represents dodecyl, its N-acetyl derivative and its N,O,O-triacetyl derivative.

15. A member selected from the group consisting of the erythro-compound of the formula:

R—CH$_2$—C≡C—CH(OH)CH(NH$_2$)CH$_2$OH in substantially pure form wherein R represents dodecyl, its N-acetyl derivative and its N,O,O-triacetyl derivative.

16. Threo-1,3-dihydroxy-2-amino-octadec-4-yne in substantially pure form.

17. Erythro-1,3-dihydroxy-2-amino-octadec-4-yne in substantially pure form.

18. Threo-cis-1,3-dihydroxy-2-amino-ocatdec-4-ene in substantially pure form.

19. Threo-trans-1,3-dihydroxy-2-amino-octadec-4-ene in substantially pure form.

20. A member selected from the group consisting of the cis-isomer of the erythro compound of the formula:

R—CH$_2$—CH=CH—CH(OH)CH(NH$_2$)CH$_2$OH in substantially pure form, wherein R represents dodecyl, its N-acetyl derivative and its N,O,O-triacetyl derivative.

21. Erythro - cis - 1,3 - dihydroxy - 2 - amino - octadec-4-ene in substantially pure form.

22. In a process for the stereo-specific manufacture of threo-1,3-dihydroxy-2-amino-octadec-4-ene, the steps which comprise contacting hexadec-2-ynal-(1) with β-nitroethanol, reacting the resulting threo-1,3-dihydroxy-2-nitro-octadec-4-yne with benzaldehyde in the presence of zinc chloride, reducing the resulting 2-phenyl-4-pentadec-1'-ynyl-5-nitro-m-dioxane with aluminum amalgam to form the 2-phenyl-4-pentadec-1'-ynyl-5-amino-m-dioxane, treating said 2-phenyl-4-pentadec-1'-ynyl-5-amino-m-dioxane with an acid agent to split the m-dioxane ring and form threo-1,3-dihydroxy-2-amino-octadec-4-yne and, at any stage after the reduction of the nitro group, reducing the triple bond to a double bond with a member selected from the group consisting of an alkali metal in an alcohol, lithium aluminum hydride and hydrogen in the presence of a poisoned palladium catalyst.

23. In a process for the stereo-specific manufacture of trans-threo-1,3-dihydroxy-2-amino-octadec-4-ene, the steps which comprise contacting hexadec-2-ynal-(1) with β-nitroethanol, reacting the resulting threo-1,3-dihydroxy-2-nitro-octadec-4-yne with benzaldehyde in the presence of zinc chloride, reducing the resulting 2-phenyl-4-pentadec-1'-ynyl-5-nitro-m-dioxane with aluminum amalgam to form the 2-phenyl-4-pentadec-1'-ynyl-5-amino-m-dioxane, acetylating the amino group of said 2-phenyl-4-pentadec-1'-ynyl-5-amino-m-dioxane, treating the resulting 2-phenyl-4-pentadec-1'-ynyl-5-acetamino-m-dioxane with an acid agent to split the m-dioxane ring and form the threo-1,3-dihydroxy-2-acetamino-octadec-4-yne, and at any stage after the reduction of the nitro group reducing said compound with sodium in alcohol to form trans-threo-1,3-dihydroxy-2-amino-octadec-4-ene.

24. In a process for the stereo-specific manufacture of cis-threo-1,3-dihyroxy-2-amino-octadec-4-ene, the steps which comprise contacting hexadec-2-ynal-(1) with β-nitroethanol, reacting the resulting threo-1,3-dihydroxy-2-nitro-octadec-4-yne with benzaldehyde in the presence of zinc chloride, reducing the resulting 2-phenyl-4-pentadec-1'-ynyl-5-nitro-m-dioxane with aluminum amalgam to form the 2-phenyl-4-pentadec-1'-ynyl-5-amino-m-dioxane, acetylating the amino group of said 2-phenyl-4-pentadec-1'-ynyl-5-amino-m-dioxane, treating the resulting 2-phenyl-4-pentadec-1'-ynyl-5-acetamino-m-dioxane with an acid agent to split the m-dioxane ring and form the threo-1,3-dihydroxy-2-acetamino-octadec-4-yne, and at any stage after the reduction of the nitro group reducing said compound with hydrogen in the presence of a poisoned palladium catalyst to form N-acetyl-cis-threo-1,3-dihydroxy-2-amino-octadec-4-ene, and splitting off the acetyl group by hydrolysis.

25. In a process for the stereo-specific manufacture of trans - threo - 1,3 - dihydroxy - 2 - amino - octadec - 4-ene, the steps which comprise contacting hexadec-2-ynal-(1) with β-nitroethanol, reacting the resulting threo-1,3-dihydroxy-2-nitro-octadec-4-yne with benzaldehyde in the presence of zinc chloride, reducing the resulting 2-phenyl-4-pentadec-1'-ynyl-5-nitro-m-dioxane with aluminum amalgam to form the 2-phenyl-4-pentadec-1'-ynyl-4-amino-m-dioxane, acetylating the amino group of said 2-phenyl-4-pentadec-1'-ynyl-4-amino-m-dioxane, treating the resulting 2-phenyl-4-pentadec-1'-ynyl-5-acetamino-m-dioxane with an acid agent to split the m-dioxane ring and form the threo-1,3-dihydroxy-2-acetamino-octadec-4-yne, and splitting off the acetyl group with sodium ethylate to form threo-1,3-dihydroxy-2-amino-octadec-4-yne, the triple bond of which is then reduced with lithium aluminum hydride to yield trans-threo-1,3-dihydroxy-2-amino-octadec-4-ene.

26. In a process for the stereo-specific manufacture of cis-erythro-1,3-dihydroxy-2-amino-octadec-4-ene, the steps which comprise contacting hexadec-2-ynal-(1) with β-nitroethanol, reacting the resulting threo-1,3-dihydroxy-2-nitro-octadec-4-yne with benzaldehyde in the presence of zinc chloride, treating the resulting threo-2-phenyl-4-pentadec-1'-ynyl-5-nitro-m-dioxane with sodium ethylate, reducing in the resulting erythro-2-phenyl-4-pentadec-1'-ynyl-5-nitro-m-dioxane the nitro group with aluminum amalgam to the amino group, treating the resulting erythro - 2 - phenyl - 4 - pentadec - 1' - ynyl - 5 - amino-m-dioxane with an acid agent to split the m-dioxane ring and form the erythro-1,3-dihydroxy-2-amino-octadec-4-yne and reducing said compound with hydrogen in the presence of a poisoned palladium catalyst to form cis-erythro-1,3-dihydroxy-2-amino-octadec-4-ene.

27. Threo-1,3-dihydroxy-2-acetylamino-octadec-4-yne.
28. Threo - 1,3 - di - acetyloxy - 2 - acetylamino - octadec-4-yne.
29. Erythro - 1,3 - dihydroxy - 2 - acetylamino - octadec-4-yne.
30. Erythro - 1,3 - di - acetyloxy - 2 - acetylamino - octadec-4-yne.

References Cited in the file of this patent

UNITED STATES PATENTS

| | | |
|---|---|---|
| 2,160,138 | Gaylor | May 30, 1939 |
| 2,247,256 | Senkus | June 24, 1941 |
| 2,297,921 | Senkus | Oct. 6, 1942 |
| 2,522,959 | Plant | Sept. 19, 1950 |

OTHER REFERENCES

Carter: Journal of Biological Chemistry, 142, 1942, pages 449–450.
Carter: Chem. Abstracts, 42, 1948, columns 117 and 118.
Barnett: Stereochemistry, Sir Isaac Pitman and Son, Ltd., London, 1950, pages 3–7.
Grob: Helvetica Chimica Acta, 34 (1951), pages 2249–2254.
Jenny et al.: Helv. Chem. Acta, volume 36, pages 1454–1463, 1953.
Ahmad: Journal of Indian Chemical Society, 31 (1954), pages 309–310.
Kiss et al.: Chem. and Ind., May 1, 1954, page 517.
Shapiro et al.: Jour. Amer. Chem. Soc., volume 76, pages 5894–5 (1954).
Fieser and Fieser: "Organic Chemistry," 1956, Reinhold Publishing Co., 3rd edition, pages 264, 267, 280.
Fieser: Organic Chemistry, 1956, pages 269–275.
Grob et al.: Experientia, volume 12, pages 334–5, Sept. 5, 1956.